INVENTOR.
Alfred Schwarz
BY Edward H. Cumpston
his Attorney

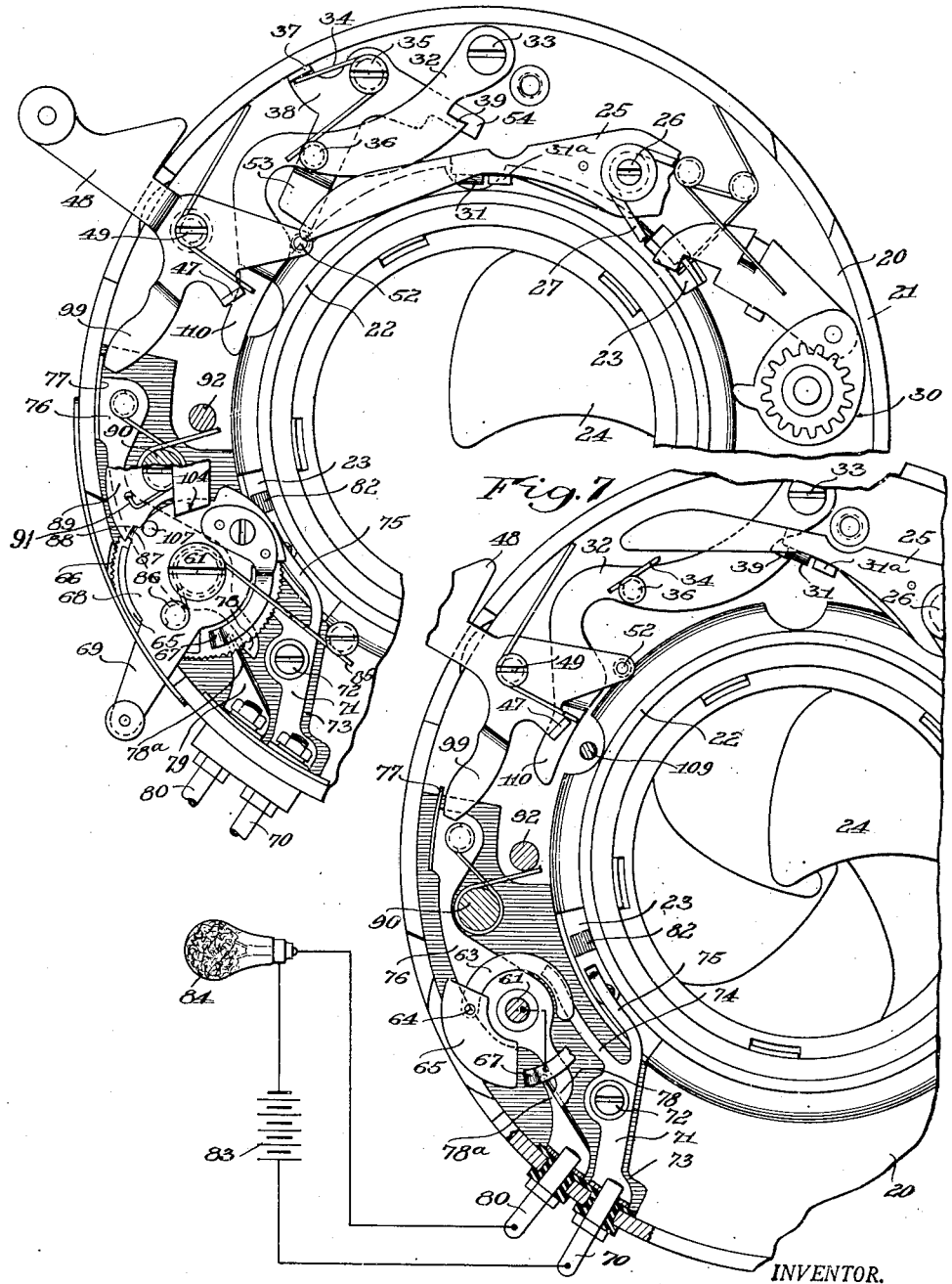

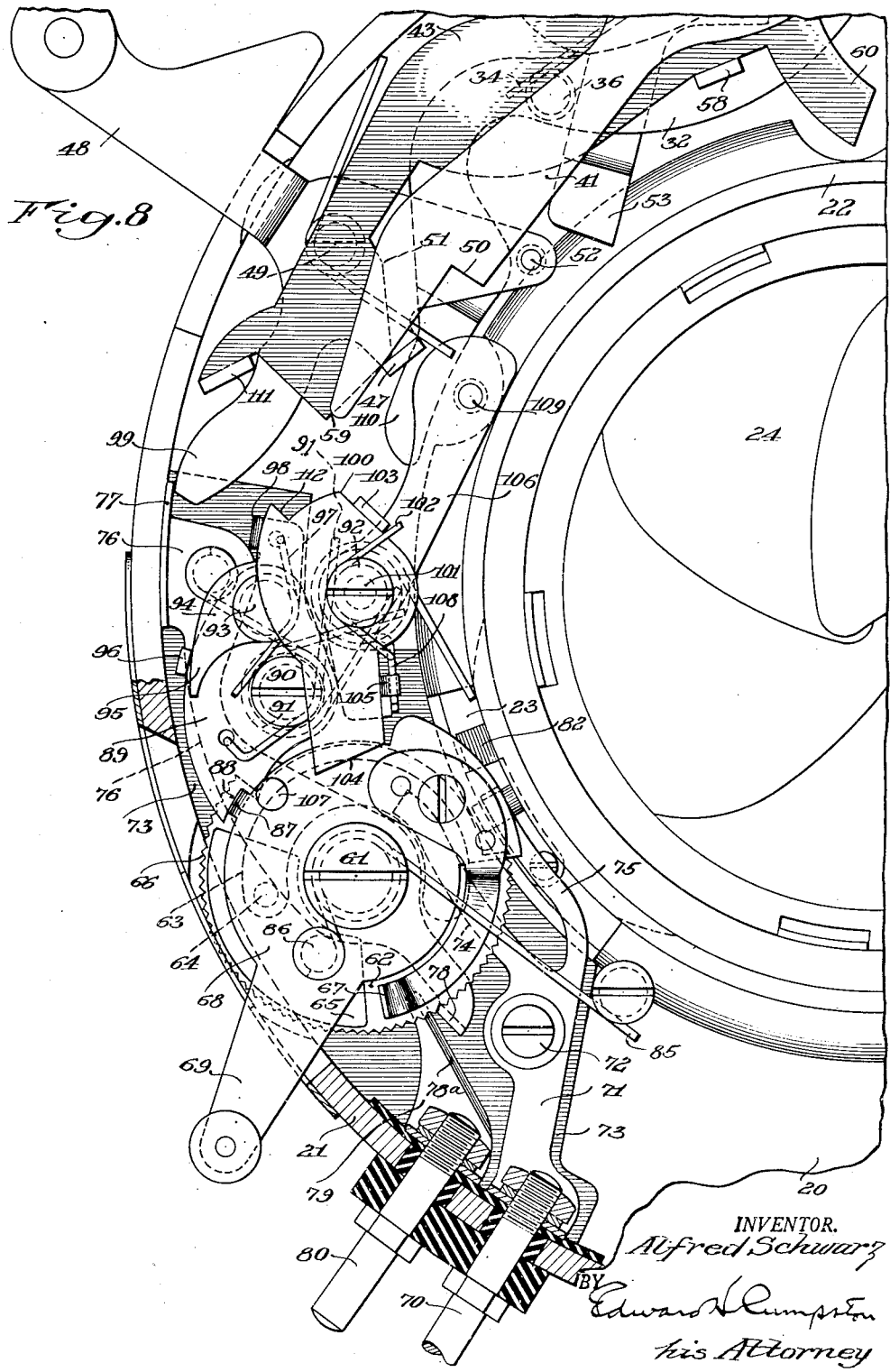

Dec. 6, 1949 A. SCHWARZ 2,490,163
PHOTOGRAPHIC SHUTTER HAVING FLASH SYNCHRONIZER
WITH SAFETY INTERLOCK
Filed Jan. 24, 1947 4 Sheets-Sheet 4
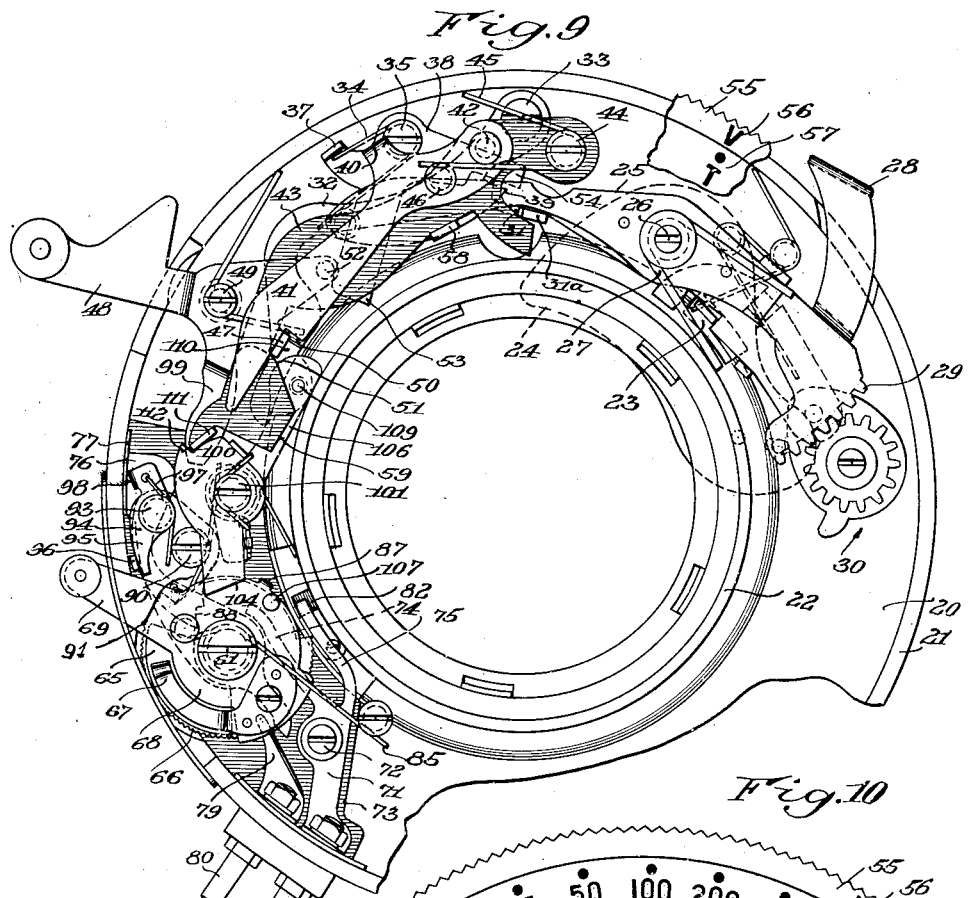
INVENTOR.
Alfred Schwarz
BY
Edward H. Cumpston
his Attorney Patented Dec. 6, 1949

2,490,163

UNITED STATES PATENT OFFICE 2,490,163

PHOTOGRAPHIC SHUTTER HAVING FLASH SYNCHRONIZER WITH SAFETY INTERLOCK

Alfred Schwarz, Rochester, N. Y., assignor to Ilex Optical Company, Rochester, N. Y., a corporation of New York Application January 24, 1947, Serial No. 723,918

7 Claims. (Cl. 95—11.5)

This invention relates to camera shutters provided with photoflash synchronizer mechanism and, more particularly, to means for preventing the inadvertent ignition of flash lamps by improper manipulation of the mechanism, the invention being applicable, for example, to shutter mechanism such as disclosed in my United States Patents Nos. 2,355,825 and 2,358,941, and being an improvement upon the mechanism described and claimed in my United States Patent No. 2,435,161 granted January 27, 1948.

In the mechanism disclosed in my said patents, the trigger release trips the synchronizer, whenever the latter is first adjusted to set position and the synchronizer in turn trips the master member, so as to properly synchronize the flashing of the lamp with a substantially instantaneous exposure, regardless of the setting of the shutter for a "time" exposure. In certain setting combinations, however, as when the synchronizer is set after the trigger release has been operated in making a "time" exposure, the synchronizer circuit may be inadvertently closed and the lamp flashed, with the resulting wastage of bulbs and possible burning of the operator's fingers.

In the shutter mechanism disclosed in my said patent application, the timing device of the shutter is provided with safeguarding means, operative when the device is set for a "time" exposure, for actuating a switch to open the synchronizer circuit and thus completely disable the latter so long as the shutter is adjusted for "time" operation. In another embodiment disclosed in said application the timing device is provided with means for mechanically obstructing the setting movement of the synchronizer so as also to completely disable it, when the timing device is adjusted to "time" position. Such arrangements effectively prevent the wastage of flash lamps and protect the operator against burning his fingers by improper operation of the mechanism, whenever the parts are adjusted for "time" exposure.

It is sometimes desirable, however, to permit those setting combinations with which a satisfactory picture could be taken without objectionable results and to provide more selectively for safeguarding those particular combinations only which may result in the wastage of lamps or injury to the operator. Thus, in the mechanism disclosed in my said Patent No. 2,358,941, with the timing device adjusted for "time" operation, if the operator actuates the trigger release to open the blades, forgets that the blades are open and then sets the synchronizer, the safety switch and the synchronizer circuit are inadvertently closed, thereby igniting and wasting the flash lamp. Or, if the mechanism be so set and an attempt is then made to insert a flash lamp, the lamp is ignited as soon as inserted between its contacts, with the likelihood of burning the operator's fingers.

In the use of my said patented mechanism also, when adjusted for a "time" exposure, the operator may actuate the trigger release to open the blades, then close them by resetting the master member, without subsequently actuating the trigger release to complete the "time" exposure cycle, in which case the trigger release is retained at an intermediate position such that it no longer holds the safety switch open. The setting of the synchronizer under such circumstances also would allow the safety switch to close the circuit and would inadvertently ignite the flash lamp, if already inserted in the mechanism, or at the time of subsequent insertion, with similar undesirable results.

An object of the present invention, therefore, is to provide safeguarding means for so connecting the synchronizer mechanism with those parts of the shutter mechanism which produce a "time" exposure, as to interfere with the operation of the synchronizer in only those cases where such operation would result in improper closing of the flash lamp circuit.

Another object, more specifically stated, is to provide a combined shutter and synchronizer mechanism having a safety switch in the synchronizer circuit controlled conjointly by actuation of the trigger release and the setting of the synchronizer, with means for preventing operation of the synchronizer whenever such conjoint control is interrupted by first partially operating the trigger release in making a "time" exposure.

Another object is the provision of safety means of the above character in a simple and practical type of construction, adapted to operate in a reliable manner and capable of being readily and economically manufactured and assembled in combination with the shutter mechanism.

Still a further object is to supply such a safety means for mechanically locking the synchronizer against those particular setting combinations which might prove harmful, with a minimum of alteration of or addition to the normal shutter parts.

To these and other ends the invention resides in certain improvements and combinations of parts, all as will be hereinafter more fully described, the novel features being pointed out in the claims at the end of the specification.

In the drawings:

Fig. 6 is a view similar to Fig. 1, partly broken away, but with the synchronizer only in set position, some of the parts being omitted to better disclose other parts;

Fig. 7 is a view similar to Fig. 1, partly broken away, with parts omitted and schematically illustrating the synchronizer circuit;

Fig. 8 is an enlarged elevation of some of the parts as shown in Fig. 1, partly in section and partly broken away for better illustration;

Fig. 9 is a view similar to Fig. 1, but with the trigger release partially operated to open the shutter blades for a "time" exposure and the parts in position to prevent the setting of the synchronizer; and Fig. 10 is a view similar to Fig. 9, illustrating more particularly the locking of the synchronizer in unset position.

Figure 1:
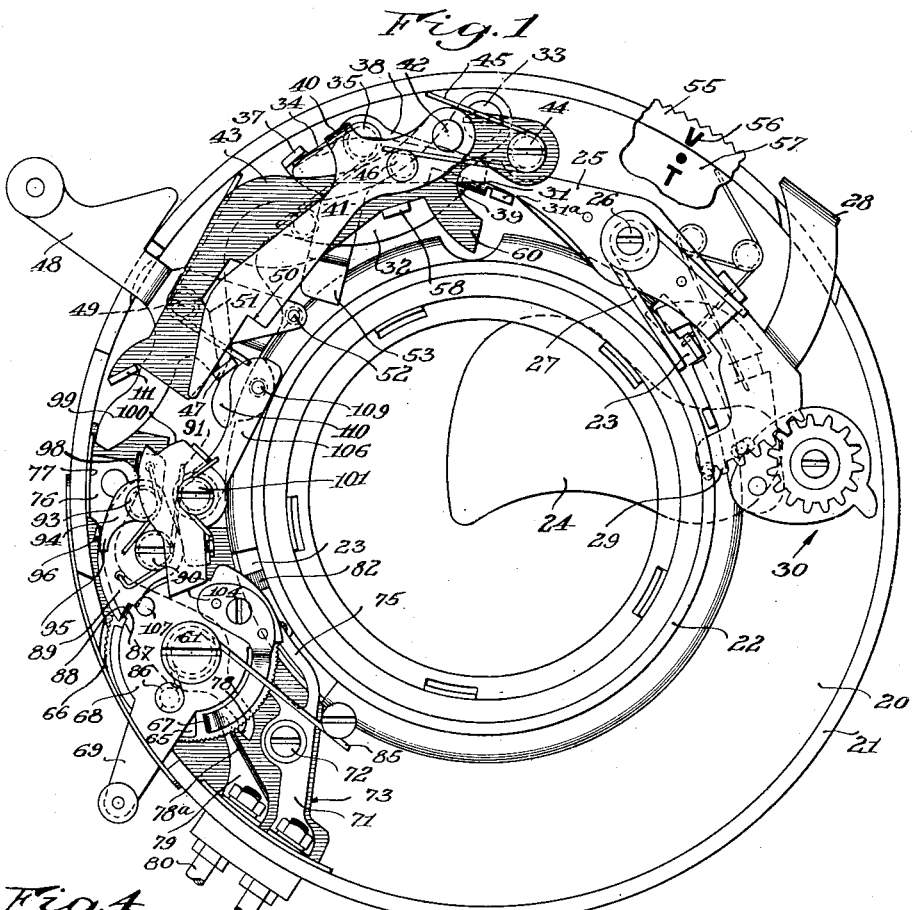
Fig. 1 is an elevation of a shutter mechanism embodying the present invention, adjusted for "time" operation, with the master member and synchronizer in set positions and the blades closed, one of the casing walls being removed and parts omitted to better disclose the mechanism.

In the embodiment of the invention herein disclosed by way of illustration, the combined shutter and synchronizer mechanism is housed in a casing comprising preferably an annular rear wall 20, Fig. 1, having an outer cylindrical flange 21 and an inner cylindrical flange 22, the mechanism being mainly mounted on the wall 20 between the flanges. The usual blade ring is shown at 23 and connected in the usual way (not shown) with the usual series of blades, one of which is shown at 24, for opening and closing the exposure opening within the inner flange 22, as well understood in the art.

The master member or lever 25 is pivoted on a post 26 on the wall 20 and actuated by a spring 27 coiled about the post and bearing against the lever and the casing, to normally swing the lever counterclockwise and project its operating finger piece 28 through an opening in the casing flange 21. The master lever is set or tensioned by depressing finger piece 28 and the adjacent end of the lever carries a rack sector 29 for driving blade actuating and retarding mechanisms indicated generally at 30, and having any known and suitable construction, as well understood in the art.

The opposite or left hand end of the master lever has a depending lug 31, Figs. 1, 6, and 7, positioned to engage and swing a locking lever 32 pivoted at 33 on wall 20, against the tension of a spring 34 coiled about a post 35 on wall 20 and having one end bearing against a post 36 on locking lever 32. The other end of the spring bears against a lug 37 on a lever 38 pivoted on post 35 for locking the release lever as hereafter described.

Figures 2, 3, 4, 5:
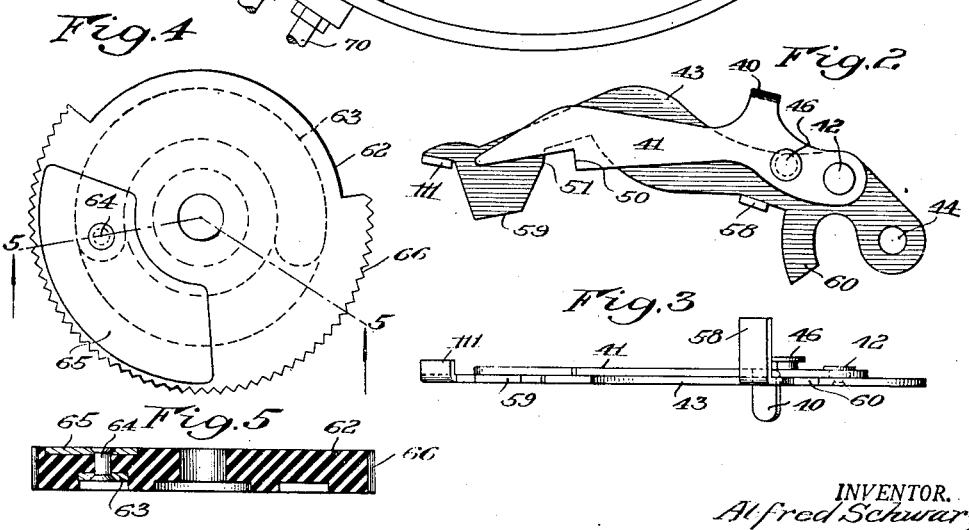
Fig. 2 is an enlarged elevation of a pair of pivoted levers for connecting the master member, the trigger release and the synchronizer and preventing operation of the latter in certain settings of the parts.
Fig. 3 is an edge view of the levers shown in Fig. 2.
Fig. 4 is an enlarged elevation of an adjustable, time controlling, contact disk forming part of the synchronizer mechanism.
Fig. 5 is a sectional view on the line 5—5 in Fig. 4.

Locking lever 32 is formed with a shoulder 39 which is adapted to snap under lug 31 of master lever 25 to lock it in set position. Master lever 25 has its other end extending beyond lug 31 and arranged, when moved to set position, to engage a depending lug 40, Figs. 1 and 2, on a lever 41 pivoted at 42 on a lever 43 which is pivoted in turn on a post 44 on wall 20. A spring 45 coiled about post 44 has one end bearing against the casing and the other against a lug 46 on lever 41, to urge both of the connected levers 41 and 43 inwardly to position to engage a lug 47 on a trigger release lever 48, pivoted at 49 on wall 20, whenever the shutter is set for a "time" exposure, as hereafter described. To this end lever 41 is provided with a shoulder 50 and lever 43 with an opposing shoulder 51 for engagement with opposite sides of lug 47 of the release lever, as best shown in Figs. 9 and 10.

Trigger release lever 48 carries a pin 52 for engaging and swinging locking lever 32 so as to release from its shoulder 39 the lug 31 of master lever 25, and so release the master lever for actuation of the shutter blades. The release lever is locked against movement, however, except when the master lever is set, by means comprising the end of one arm 53 of lever 38 which normally lies in the path of pin 52 of the release lever, as shown in Fig. 6. When the master lever is set, however, its lug 31 engages another arm 54 of lever 38 and swings the lever against its spring to move its other arm 53 out of the path of pin 52, so as to unlock the release lever for movement to trip the locking lever 32 and the master lever.

The timing device for the shutter comprises the usual ring 55 (Figs. 1 and 10) rotatably mounted on the casing to selectively position its index 56 opposite the usual time scale indicated generally at 57 and including a "time" position indicated by "T." Ring 55 is provided with cam means (not shown) for engaging a lug 58 on lever 43 and holding lever 43 in an outward position except in the "time" and "bulb" settings of the ring in which the lever is spring actuated inwardly so that a projecting portion 59 thereof bears against lug 47 of the release lever. In a "time" setting, on movement of the release lever in a counter-clockwise direction, lever 43 moves inwardly until its shoulder 51 engages behind the lug 47 of the release lever and holds the latter in partially actuated and intermediate position. In this position a spur 60 on lever 43 moves underneath a lug 31a of the master lever 25. Continued movement of the release lever trips the locking lever 32 and releases the master lever which moves to open the blades.

When the blades are open, the lug 31a of the master lever is stopped by spur 60 of lever 43, thus holding the blades in open position. The partial release of the master lever causes its left hand end to release lug 40 of lever 41 which is then moved inwardly by its spring to engage its shoulder 50 in advance of lug 47 of the trigger release, the latter being then held between shoulders 50 and 51 of levers 41 and 43. A second actuation of the trigger release presses lever 41 longitudinally toward its pivot 42 on lever 43, thus swinging lever 43 outwardly so that its spur 60 releases master lever 25 and allows it to complete its movement and close the blades, the trigger release being simultaneously freed by the lever 43 for return to initial position. In the open position of the blades, however, the master lever may be reset and relocked by the locking lever 32, while the end of the master lever again raises lever 41 to free the trigger release for a second actuation to open the blades.

The synchronizer mechanism is built into the shutter casing and is interposed in its action between the trigger release lever and the master lever, as described in my said patents. That is, when the synchronizer mechanism is set for action, the operation of the release lever trips the synchronizer which in turn trips the locking lever 32 and allows the master lever to open and close the blades in synchronism with the ignition of the flash bulb.

The synchronizer comprises a post 61 on wall 20 (Figs. 7 and 8) on which is rotatably mounted a disk 62 of insulating material (Figs. 4, 5 and 8) having embedded in the under side thereof a concentric contact strip 63 which is electrically connected by a metal rivet 64 with a contact plate 65 embedded in the upper surface of the disk, these parts being shown schematically in Fig. 7, detached from the disk. The disk has a peripheral portion 66 which is raised and knurled so as to project through a slot in the wall of the casing for rotary adjustment on post 61, to adjust the position of contact plate 65 relative to a spring contact finger 67 (Figs. 7 and 8) fixed on a disk 68 rotatably mounted on post 61 and having an operating finger piece 69 projecting through a slot in the casing. Disk 68 is adapted to be latched in set position against the tension of a spring, as shown in Fig. 8 and tripped to operate the synchronizer circuit, as hereafter described.

The synchronizer circuit comprises a jack 70 (Figs. 7 and 8) mounted in and insulated from the flange 21 of the casing within which it is connected to a conducting metal strip 71 fixed on a post 72 on wall 20, strip 71 being insulated from the post and the casing by suitable known means comprising a plate of insulating material 73 laid against wall 20. The other end of strip 71 is bifurcated to form a pair of spring contact fingers, 74 and 75, finger 74 being arranged to bear against the arcuate contact strip 63 on the under side of disk 62. Finger 75 is arranged to engage a contact on the blade ring as hereafter described.

Pivotally mounted on post 61 is a metal safety switch arm 76 (Figs. 7 and 8) having one end formed with a flange 77 adapted to lie against the inner face of flange 21 of the casing, in position to be engaged by parts of both the release lever and a synchronizer locking lever as hereafter described. The other end of switch arm 76 is provided with a beveled contact edge 78 for engagement with a similar edge 78a on a metal strip 79 connected to the inner end of a second jack 80 mounted in and insulated from the casing flange 21.

The other contact finger 75 of strip 71 bears against a peripheral portion of the blade ring 23 at which its surface is coated with any suitable insulating material. In this insulated portion, however, is a small metal area 82 in conducting relation with the ring and through the latter with the casing, post 61 and switch arm 76. Contact finger 75 and this contact area 82 of the blade ring are thus adapted to close the circuit, when the ring is moved to the position in which the blades are open, as soon as switch arm 76 is closed in contact with the metal strip 79 and jack 80. Jacks 70 and 80 are connected in circuit with a battery 83 and flash lamp 84 (Fig. 7).

It is apparent from these circuit arrangements that current from the battery 83 passes through jack 70 into the conducting strip 71 and thence to its contact fingers 74 and 75. When disk 62 is adjusted to position its plate 65 for coaction with contact finger 67 and synchronizer disk 68 is set and tripped, with the safety switch contacts 78 and 78a closed, current passes through the synchronizer circuit to ignite the flash lamp 84 at an interval in advance of the full opening of the shutter blades, as predetermined by the adjusted position of the disk 62 and its plate 65. When employing a lamp of the known gaseous variety, having a zero time lag, however, plate 65 is adjusted at a greater distance from finger 67, and the circuit is then closed through contact finger 75 and the conducting area 82 on the blade ring, at the instant of full opening of the blades, for synchronously flashing the lamp.

Disk 68 is rotated by spring means 85 coiled about post 61 and connected with a pin 86 on the disk and with the casing and means are provided for releasably latching the disk in the set position shown in Figs. 1, 6, 7, and 8. This locking means comprises, preferably, a lug 87 on the disk coacting with a notched portion 88 on a latch or dog 89 pivoted on a post 90 on casing wall 20. A spring 91 wound about the post is connected with the dog and bears against a post 92 on the casing so as to urge the dog toward latching relation with lug 87 of the disk. The dog carries a post 93 (Figs. 8 and 9) on which is pivoted a pawl 94 having one end 95 urged toward a stop 96 on the dog by a spring 97, the other end 98 of the pawl being positioned for engagement with the flange 77 of switch arm 76 to open the circuit as shown in Fig. 9 except while the dog is in position for locking the disk 68 in set position as shown in Fig. 8.

Release lever 48 has a tail part 99 positioned to engage the end 98 of pawl 94 and trip dog 89 to release the synchronizer disk, when the release lever is moved to effect an exposure. During return movement of the release lever, however, its tail 99 swings pawl 94 idly in the opposite direction so as to clear it for return to inactive position in which its tail part 99 engages flange 77 of the switch arm 76 to hold the switch contacts open.

The connection between the synchronizer and the locking lever 32 for the master member comprises preferably a pawl 100 pivoted on a post 101 on wall 20. A spring 102 coiled about the post, bears at one end against a lug 103 on the pawl so as to urge its opposite end 104 against a lug 105 on a lever 106 pivoted on post 101. End 104 of the pawl is inclined, as shown, and normally lies in the path of a pin 107 on the synchronizer disk 68. In its normal condition, pawl 100 yields against the tension of its spring to permit pin 107 to pass in a counterclockwise direction as the synchronizer disk 68 is moved to set position, but when the latter is tripped, its pin 107 is moved to engage and press the pawl against lug 105 to swing lever 106 in a counterclockwise direction against the action of a spring 108 connected to it and wound about the post 101. Lever 106 carries a pin 109 positioned to engage the adjacent end 110 of locking lever 32 and trip it to release the master lever.

It is apparent from the above construction that when synchronizer disk 68 is moved counterclockwise to set position its lug 87 is engaged and held by locking pawl 89, the latter being swung by the lug so that its pawl 94 releases flange 77 of the safety switch arm 76. On actuation of the release lever 48, its tail part 99 strikes lug 98 of the pawl so as to trip the latch or dog 89 and release the synchronizer disk 68. As the latter is turned clockwise by its spring, its pin 107 strikes pawl 100 and turns it with lever 106 to trip the locking lever 32 and the master member and open the shutter blades, in synchronism with the ignition of the flash lamp by engagement of contact finger 67 with contact plate 65, or by engagement of contact finger 75 with the blade ring contact 82, depending upon the character of lamp employed and the adjustment of the synchronizer disk 62. The construction and operation so far described are substantially the same as disclosed in my said Patent No. 2,358,941 to which reference may be had for a more detailed description.

It is apparent also from the above construction that the actuation of the trigger release member and the movement of the synchronizer to set position are both necessary to release the switch arm 76 for closing the contacts 78 and 78a in order to condition the circuit for control by the synchronizer action. If the synchronizer is first set before actuation of the release member, regardless of adjustment of the timing device to its "time" position, the release member trips the synchronizer which in turn trips the master member to effect a substantially instantaneous exposure with synchronous ignition of the flash lamp, as required for a successful exposure. If the timing device has been adjusted to its "time" position, the release member may be at once operated a second time to close the shutter blades and there is no harmful interference with such an exposure due to inadvertent adjustment of the timing device to "time" position.

On the other hand, with the shutter adjusted for a "time" exposure, the actuation of the release member and its retention in an intermediate position by the connection with the timing device, acts to free the safety switch arm 76, so that subsequent setting of the synchronizer, as so far described, would close the circuit and result in inadvertent flashing of the lamp. That is, after pressing the release member to open the blades for a "time" exposure, the movement of the synchronizer toward set position would immediately close the lamp circuit, either through the adjustable contacts 65 and 67 or through the blade ring contacts 75 and 82, depending upon the adjustment of the disk 62. A lamp already inserted in the circuit would be flashed, or, if subsequently inserted after setting the synchronizer, it would be flashed on insertion with the danger of burning the operator's fingers. In such a setting combination, even if the shutter blades have been closed by resetting of the master member, the release lever being still retained by the timing device levers 41 and 43, the movement of the synchronizer to set position would fully release the switch arm 76 to close the safety contacts 78 and 78a and the lamp, if already inserted, would be ignited immediately through the adjustable contacts 65 and 67, or upon closing blade ring contacts 75 and 82 on a second actuation of the release member to open the blades for a "time" exposure. If the synchronizer were set before inserting the bulb, the bulb would be ignited and wasted on the second actuation of the release lever to open the blades for a "time" exposure.

I have found that these particular setting combinations, which would inadvertently ignite the lamp, may be reliably safeguarded by the provision of suitable means for directly connecting the synchronizer mechanism with one of the levers controlled by the timing device for holding the release lever in the intermediate position in which it effects a "time" exposure and also releases its control of the safety switch arm 76. For this purpose, preferably, the lever 43 is extended beyond its cam portion 59 to produce a latch portion 111, Fig. 8, adapted to interlock with a shoulder 112 formed on the synchronizer pawl 100 and hold it in position for obstructing the setting movement of the synchronizer. On adjustment of the timing device for a "time" exposure and actuating the trigger release lever to open the blades, lever 43 is moved to position for engaging lug 47 of release lever 48 to hold it in its intermediate position, as shown in Figs. 9 and 10, and in this position of lever 43, its latching portion 111 is placed in the path of movement of shoulder 112 of the synchronizer pawl 100 so as to obstruct the clockwise movement which the pawl normally has in order to allow pin 107 of the synchronizer disk 68 to pass the pawl in the setting movement of the synchronizer disk. That is, pawl 100 is latched with its end 104 lying across the path of the movement of pin 107 during the setting adjustment of the synchronizer. The thrust of the pin against the end of the pawl is substantially in line with the pawl pivot and the setting movement of the synchronizer is thus positively blocked so long as lever 43 and trigger release lever 48 remain in the intermediate positions corresponding to a setting of the timing device for a "time" exposure. Full actuation of the trigger lever is then required to complete the cycle of actuation for a "time" exposure, before the synchronizer is released for operation. Whenever the shutter is adjusted for a "time" exposure and the trigger release lever is first actuated and latched in intermediate position so as to interfere with its conjoint control of the safety switch, the synchronizer is thus latched against the setting movement which would also release the safety switch and improperly ignite the lamp, and it remains in this latched condition until the release lever is actuated to complete the "time" exposure and thus restored to its conjoint control of the safety switch, in normal and proper setting combinations.

It is evident that the invention safeguards the synchronizer circuit in those particular setting combinations only in which inadvertent flashing of the lamp may occur, without interference with other harmless or useful combinations and that this safeguarding function is accomplished by simple, positive and reliable means with a minimum of alteration of or addition to normal shutter parts.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of the parts will readily occur to those skilled in the art, within the spirit of the invention and the scope of the appended claims.

I claim:

1. A photographic shutter comprising blade means, a spring actuated master member of the "set" type having connections with said blade means for operating the same, means for locking said master member in "set" position, a release member for actuating said locking means to release said master member for substantially instantaneous operation of said blade means, a timing device comprising lever means adapted to be positioned for actuation by said release member to effect "time" operation of said blade means, a spring actuated photoflash synchronizer mechanism movable to "set" position and detent means connecting said lever means and mechanism for holding said mechanism in "unset" position when said timing device means is positioned for "time" operation of said shutter and said release member is operated to open the shutter blades.

2. A photographic shutter comprising blade means, a spring actuated master member of the "set" type having connections with said blade means for operating the same, means for locking said master member in "set" position, a release member for actuating said locking means to release said master member for substantially instantaneous operation of said blade means, a timing device comprising lever means adapted to be positioned for actuation by said release member to effect "time" operation of said blade means, a spring actuated photoflash synchronizer mechanism movable to "set" position, normally yieldable detent means for said mechanism, and cooperating parts on said detent means and said lever means for holding said detent means and thereby obstructing the setting of said mechanism when said timing device is positioned for "time" operation of said shutter and actuated by said release member.

3. A photographic shutter comprising blade means, a spring actuated master member of the "set" type having connections with said blade means for operating the same, means for locking said master member in "set" position, a release member for actuating said locking means to release said master member for substantially instantaneous operation of said blade means, a timing device comprising a pair of connected levers adapted to be positioned for engaging and restraining said release member and for actuation thereby to effect "time" operation of said blade means, a spring actuated photoflash synchronizer mechanism and cooperating parts on one of said levers and said mechanism for obstructing the operation of said mechanism when said timing device is positioned for "time" operation of said shutter and actuated by said release member.

4. A photographic shutter comprising a casing having an aperture, blade means for controlling said aperture, a spring actuated master member of the "set" type having connections with said blade means for operating the same, means for locking said master member in "set" position, a release member for actuating said locking means to release said master member for substantially instantaneous operation of said blade means, a timing device comprising a pair of connected levers adapted to be positioned for engaging and restraining said release member and for actuation thereby for controlling said master member to effect "time" operation of said blade means, a photoflash synchronizer mechanism in said casing adapted to be set to operating position independently of said release member, a normally yieldable element pivoted on said casing in the path of movement of a part of said mechanism, and a part on one of said levers adapted to engage and hold said element against yielding to obstruct said mechanism when said timing device is positioned for "time" operation of said shutter and actuated by said release member.

5. A photographic shutter comprising a casing having an exposure aperture, blade means controlling said aperture, a spring actuated master member of the "set" type having connections with said blade means for operating the same, means for locking said master member in "set" position, a release member for actuating said locking member to release said master member to effect a substantially instantaneous exposure, a timing device comprising means adapted to be positioned for engaging and restraining said release member and for actuation thereby for controlling said master member to effect "time" operation of said blade means, a photoflash synchronizer mechanism in said casing adapted to be set to operating position independently of said release member, means connecting said mechanism with said master member for releasing said master member to effect a substantially instantaneous exposure, said connecting means comprising a pawl positioned in the path of movement of a part of said mechanism for actuation thereby and normally adapted to yield during the setting movement of said mechanism, and detent means for connecting said pawl and said timing device means to obstruct yielding of said pawl and the setting of said mechanism when said release member is engaged by said timing device means.

6. A photographic shutter comprising a casing having an exposure aperture, blade means for said aperture, a spring actuated master member of the "set" type having connections with said blade means, means for locking said master member in "set" position, a release member for actuating said locking means to release said master member, a timing device comprising means coacting with said release member for controlling said master member to effect "time" operation of said blade means, a spring actuated synchronizer mechanism in said casing adapted to be moved against said spring to "set" position and having a lamp circuit including a safety switch, means for latching said mechanism in "set" position, connections between said release member and latching means for tripping said latch means to release said mechanism, means operated conjointly by actuation of said release member and by setting movement of said mechanism for closing said switch, and a connection between said mechanism and said timing device for obstructing the setting of said mechanism when said timing device is positioned for "time" operation of said blade means and said release member is operated for opening said blades.

7. A photographic shutter comprising a casing having an exposure aperture, blade means for said aperture, a spring actuated master member of the "set" type having connections with said blade means for operating the same, means for locking said master member in "set" position, a release member for actuating said locking means to release said master member, a timing device comprising lever means coacting with said release member for controlling said master member to effect "time" operation of said blade means, spring actuated synchronizer mechanism in said casing adapted to be moved against said spring to a "set" position and having a lamp circuit including a safety switch, means for latching said mechanism in "set" position, connections between said release member and latching means for tripping said latching means to release said mechanism, means operated conjointly by actuation of said release member and by setting movement of said mechanism for closing said switch, and detent means connecting said mechanism with said lever means for obstructing the setting of said mechanism when said timing device is positioned for "time" operation of said blade means and said release member is actuated to effect a "time" exposure.

ALFRED SCHWARZ.

REFERENCES CITED

The following references are of record in the file of this patent:

UNITED STATES PATENTS

| Number | Name | Date |
| --- | --- | --- |
| 2,319,086 | Riddell | May 11, 1943 |
| 2,355,825 | Schwarz | Aug. 15, 1944 |
| 2,358,941 | Schwarz | Sept. 26, 1944 |
| 2,435,161 | Schwarz | Jan. 27, 1948 |